Feb. 28, 1939.  E R. BARRETT  2,148,798
DUMP BODY TRUCK
Filed Aug. 1, 1938  2 Sheets-Sheet 1

INVENTOR
Edward R. Barrett.
BY
Harness, Dickey & Pierce.
ATTORNEYS.

Feb. 28, 1939.     E. R. BARRETT     2,148,798
DUMP BODY TRUCK
Filed Aug. 1, 1938     2 Sheets-Sheet 2

INVENTOR
Edward R. Barrett.
BY
Harness, Dickey & Pierce.
ATTORNEYS.

Patented Feb. 28, 1939

2,148,798

UNITED STATES PATENT OFFICE 2,148,798

DUMP BODY TRUCK

Edward R. Barrett, Detroit, Mich., assignor to Gar Wood Industries, Inc., Detroit, Mich., a corporation of Michigan Application August 1, 1938, Serial No. 222,420

14 Claims. (Cl. 298—20)

This invention relates to hydraulically operated dump bodies.

The main objects of this invention are to provide a hydraulically operated dump body which functions without the use of a hydraulic pump in the customary manner; to provide a hydraulically operated dump body which is mounted as a semi-trailer to a tractor and which is operated by movement of the tractor relative to the semi-trailer wheels; and to provide a simple construction of hydraulic operating mechanism which operates in a closed circuit.

An illustrative embodiment of this invention is shown in the accompanying drawings, in which.

Figure 1:
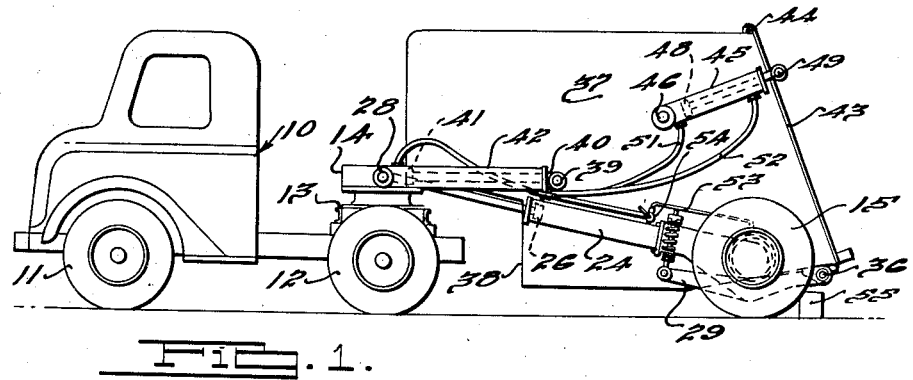
Figure 1 is a view in side elevation of a motor tractor and semi-trailer connected thereto by a fifth wheel and showing the dump body in its normal load carrying position.

Heretofore in the construction of hydraulically operated dump bodies for motor vehicles it has been the practice to provide a hydraulic pump driven usually by a power take off from the vehicle motor transmission for supplying fluid under pressure to the hydraulic ram which tilts the body to dumping position and for performing other like functions such as opening a closure gate.

In the present construction the power take off gear box, line shafting, hydraulic pump and control connections therefor are eliminated and the body tilting hydraulic ram and closure gate opening hydraulic ram are both supplied with fluid under pressure by displacement of fluid in a hydraulic ram which constitutes the connecting frame between the semi-trailer wheels and the motor tractor. With this arrangement, relative movement between the semi-trailer wheels and the tractor will actuate the hydraulic ram which connects the ground wheels and thereby displace fluid under pressure which is utilized for actuating the body tilting and gate opening rams.

In the construction shown in the drawings, a motor tractor, generally designated 10, is shown provided with the usual front guiding wheels 11 and the rear driven wheels 12 mounted on a driving axle. The motor tractor is built up to provide a support 13 for a fifth wheel 14 in the usual manner of semi-trailer units.

The semi-trailer unit is of the same construction at each side thereof so that a detailed description of one side will suffice for both.

Trailer wheels 15 are journaled on stub shafts 16 which have integrally formed flanges 17 through which tie bolts 18 pass to secure the wheel supporting shaft to a two part frame comprising members 19 and 20. The bolts 18 also help tie the members 19 and 20 together. The wheel supporting members 19 and 20 extend downwardly from the axle shaft 16 and are rigidly secured to one end of a transversely extending tie bar or shaft 21, at the opposite end of which is secured the other wheel unit of like character.

The members 19 and 20 also extend forwardly to terminate in a circular flange 22 to which is rigidly secured a similar flange 23 of a hydraulic cylinder 24, by cap screws 25. The hydraulic cylinder 24 is provided with a piston 26 to which is secured one end of a piston rod 27. The other end of the piston rod 27 extends through a stuffing box on the other end of the cylinder 24 and is pivotally attached to the fifth wheel 14 by a pivot pin 28.

The piston rods 27 and cylinders 24 constitute an extensible and contractible frame-work and connecting means between the fifth wheel 14 and the semi-trailer wheels 15, so that movement of the tractor wheels 12 relative to the semi-trailer wheels 15 will move the piston rod and piston in the cylinder 24 in one direction or the other, depending upon the direction of movement of the ground wheels with respect to each other.

The members 19 and 20 embrace and pivotally support the mid-part of a lever 29, the forward end of which is pivotally connected at 30 to the lower end of an upright rod 31. The rod 31 is slidable through a laterally extending gear or lug 32 which is integrally formed on the member 19, and is surrounded by a helical compression spring 33. One end of the spring 33 bears against the underside of the lug 32, and the other end thereof bears against a washer 34 which is adjustably positioned on the rod 31 by a pair of nuts 35.

The rear end of the lever 29 is pivotally attached by a pin 36 to the rear end of a dump body 37. The forward end of the body 37 is adapted to rest upon and be supported by the fifth wheel 14 and is cut out, as shown at 38, to provide clearance for the rear end of the tractor unit.

The dump body 37, at a point forwardly and above its point of pivotal connection 36, is pivoted by a pin 39 to one end of a piston rod 40. The other end of the piston rod 40 has a piston 41 rigid thereon which is slidable in a hydraulic cylinder 42, one end of which is provided with a stuffing box for the piston rod 40, and the other end of which is co-axially pivoted with the piston rod 27 on the fifth wheel 14 by the pin 28.

The dump body 37 is provided with a rear end door or closure gate 43 which is pivoted to the top rear end of the body at 44. The gate 43 is actuated to swing outwardly and upwardly by a hydraulic ram comprising a cylinder 45 having one end pivoted at 46 to the body, and its other end provided with a stuffing box through which extends a piston rod 47. The inner end of the piston rod is provided with a piston 48 in the customary manner, and the other end thereof is pivoted at 49 to the door 43.

The hydraulic rams are interconnected by conduits in such a manner that when fluid is displaced from the cylinder 24 by movement of the tractor wheels toward the trailer wheels, the displaced fluid will enter the body lifting hydraulic rams and thereby raise and tilt the body on its pivotal support. The fluid in the opposite ends of the body tilting rams, which is thereby displaced, will actuate the gate opening hydraulic rams to swing the gate outwardly and upwardly. The fluid which is forced out of the gate raising rams flows into the opposite ends of the cylinders 24. Thus the three hydraulic rams operate in a closed circuit. The inner end of the cylinder 24 is connected by a conduit 50 to the pivoted end of the body lifting ram 42. The outer swinging end of the cylinder 42 is connected by conduit 51 to the pivoted end of the cylinder 45, and the outer swinging end of the cylinder 45 is connected by conduit 52 to the outer end of the cylinder 24, thus forming a simple, closed, hydraulic circuit.

Figure 2:
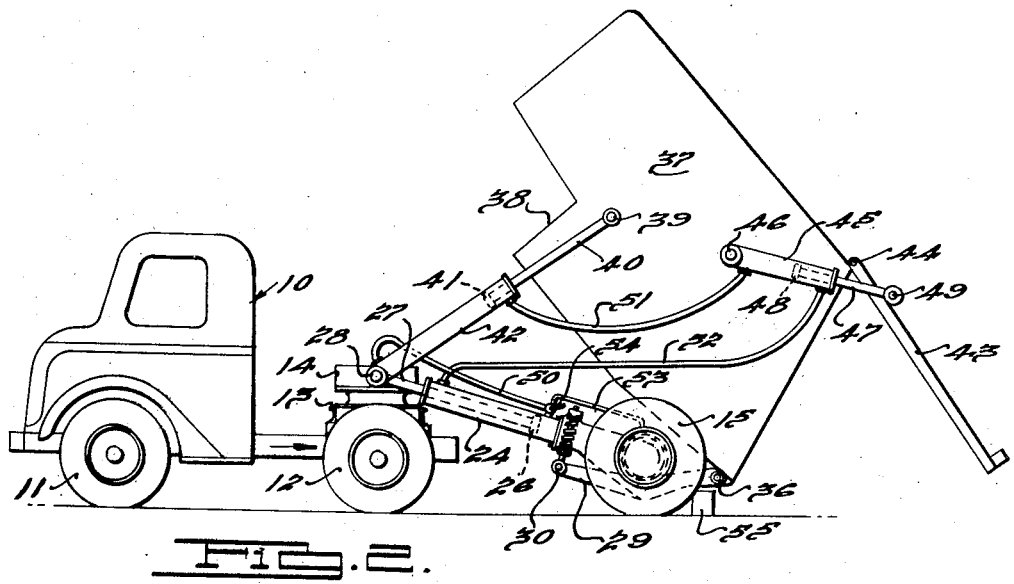
Fig. 2 is a view of the same showing the body tilted to dump the contents therefrom.
Figure 3:
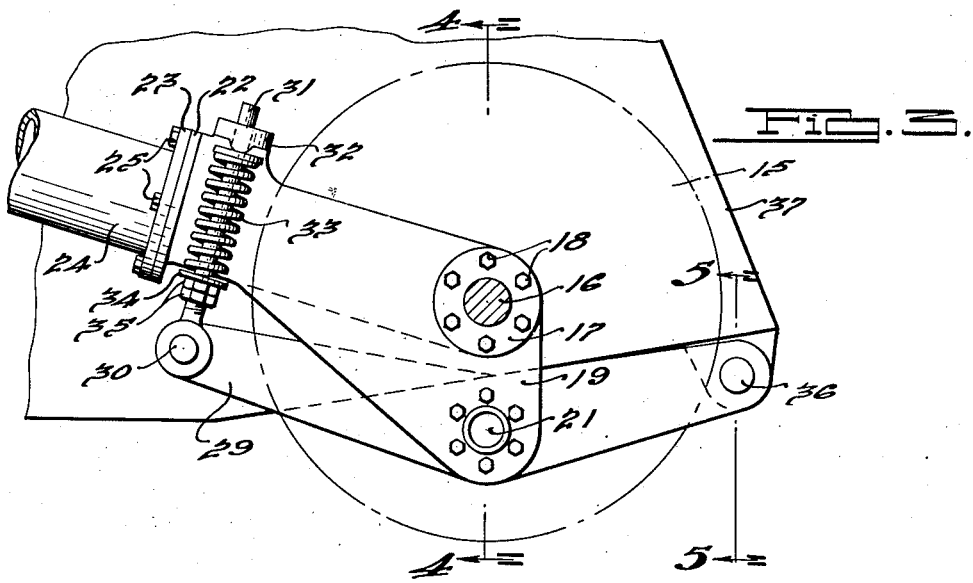
Fig. 3 is an enlarged fragmentary view showing how the body is spring mounted to the trailer frame.
Figure 4:
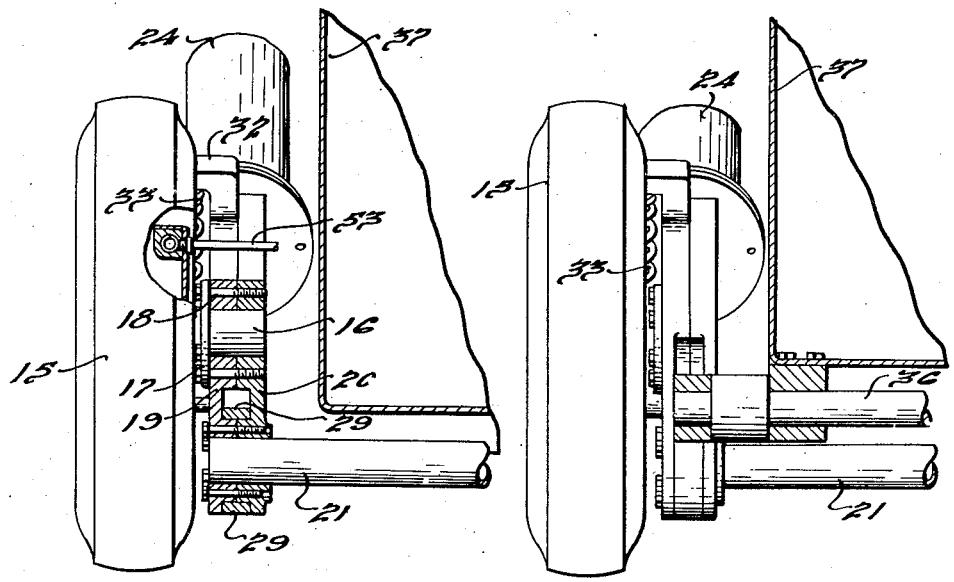
Fig. 4 is a sectional view taken on the line 4—4 of Fig. 3 looking in the direction indicated by the arrows; and, Fig. 5 is a sectional view taken on the line 5—5 of Fig. 3 looking in the direction indicated by the arrows.
Figure 5:
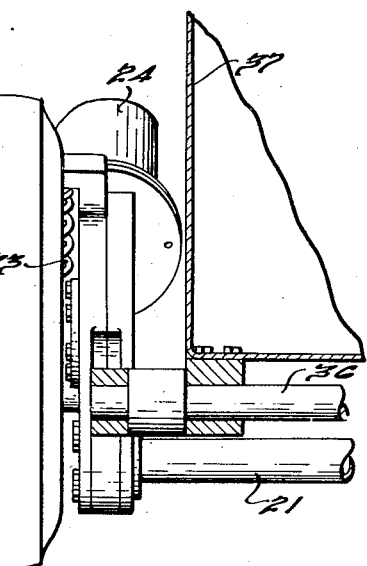

The semi-trailer wheels 15 are preferably provided with hydraulic brakes, and a lead line 53, controlled by manually operable valve 54, is provided for admitting fluid from the cylinder 24 into the hydraulic brakes so as to lock the wheels against rotation when the valve 54 is open and the dump body is being raised, as shown in Fig. 2 of the drawings.

In the operation of this vehicle, the arrangement is particularly adapted for gathering and transporting of refuse. After the body 37 has been loaded with the refuse, it is transported to a dumping ground or incinerator, at which point the tractor and trailer are backed up against a rigid, stationary, curbing block 55. At the same time the valve 54 is opened to establish communication between the rear end of the hydraulic cylinder 24 and the hydraulic brakes with which the semi-trailer wheels are provided.

Thereupon the tractor is backed further, and due to the curbing block 55, as well as action of the hydraulic brakes in the wheels, the semi-trailer wheels remain stationary. This causes a telescoping of the hydraulic rams comprising the cylinders 24 and piston rods 27, which hydraulic rams constitute the connecting frame support between the fifth wheel 14 and the semi-trailer wheels.

Telescoping of the rams 24 forces the fluid out of the rear end thereof through the conduits 50 into the pivoted ends of the body lifting rams 42, thus forcing the pistons 41 and piston rods 40 out of the cylinders 42, and thereby tilting the body 37 about its pivotal supports 36, as shown in Fig. 2 of the drawings.

As the body is tilted, fluid is displaced from the opposite side of the piston 41, and this displaced fluid passes through the conduit 51 into the pivoted end of the cylinder 45, which cause the piston 48 and piston rod 47 therein, to move outwardly and thereby swing the pivoted gate 43 outwardly and upwardly. The fluid which is displaced from the opposite side of the piston 48 passes through the conduit 52, and is stored in the outer end of the cylinder 24.

When it is desired to lower the dump body 37, the tractor is merely driven in a forward direction, thus causing a reverse of the foregoing operations. After the body has been lowered and the rear gate closed, so as to relieve the lines 53 of all pressure, the manually operable valves 54 are moved to a position to close communication between the cylinders 24 through the lines 53 to the hydraulic brakes of the semi-trailer wheels, thereby permitting a backing up of the vehicle as a whole without setting the brakes.

Although but one embodiment of this invention has been herein shown and described, it will be apparent to those skilled in the art that various changes may be made therein without departing from the spirit and scope of the appended claims.

What is claimed is:

1. A dump body vehicle, including two pairs of wheels spaced longitudinally of said vehicle and movable relatively to each other, a dump body tiltably carried by said pairs of wheels, and hydraulic means actuated by relative movement of said pairs of wheels for tilting said body to dump the same.

2. A dump body vehicle, including two pairs of wheels spaced longitudinally of the vehicle and movable relatively to each other, a hydraulic ram interconnected between said pairs of wheels, said ram being actuated by relative movement of said pairs of wheels, a dump body tiltably carried by said pairs of wheels, and means actuated by said hydraulic ram for tilting said body to dump the same.

3. A dump body vehicle, comprising two pairs of wheels spaced longitudinally of the vehicle and movable relatively to each other, a hydraulic ram interconnected between said pairs of wheels, said ram being actuated by relative movement of said pairs of wheels, a dump body tiltably carried by said pairs of wheels, a hydraulic ram interconnecting said body and one of said pairs of wheels for tilting said body to dump the same, and connections between said rams, whereby said body tilting ram is actuated when said first mentioned ram is actuated.

4. In a hydraulically operated dumping body, two pairs of ground wheels, a hydraulic ram connecting said pairs of wheels, whereby movement of one pair of wheels toward or away from the other pair of wheels displaces fluid in said ram, a body pivotally supported by said wheels, a hydraulic ram connected to said body in spaced relation to its pivotal support for tilting said body, and conduits connecting said rams whereby fluid displaced from said wheel connecting ram will actuate said body lifting ram to tilt said body on its pivotal support for dumping the same.

5. In a hydraulically operated dumping body, two pairs of ground wheels, a hydraulic ram connecting said pairs of wheels and serving as a connecting frame therebetween, whereby movement of one pair of wheels toward or away from the other pair of wheels displaces fluid in said ram, a body pivotally supported by said wheels, a hydraulic ram connected to said body in spaced relation to its pivotal support for tilting said body, and conduits connecting said rams, whereby fluid displaced from said wheel connecting ram will actuate said body lifting ram to tilt said body on its pivotal support for dumping the same.

6. In a semi-trailer having a motor tractor, a pair of ground wheels on the semi-trailer and a pair of ground wheels on the tractor, a hydraulic ram connecting said pairs of wheels, whereby movement of one pair of wheels toward or away from the other pair of wheels displaces fluid in said ram, a body having one end supported on and pivoted to said semi-trailer wheels, and its other end adapted to be supported on the motor tractor, a hydraulic ram connected to said body in spaced relation to its pivotal support for tilting said body on its pivotal support, and conduits interconnecting said rams whereby fluid displaced from said wheel connecting ram will actuate said body lifting ram to tilt said body on its pivotal support to dump the same.

7. A semi-trailer telescoping frame, comprising a hydraulic ram interconnected between the semi-trailer wheels and a fifth wheel adapted to be supported on a tractor, and a function performing hydraulic ram connected to said first mentioned ram so as to be actuated by telescoping movement of said frame.

8. A dump body vehicle, including two pairs of wheels spaced longitudinally of said vehicle and movable relatively to each other, a dump body tiltably carried by said pairs of wheels, a closure gate on said body, and hydraulic ram means actuated by relative movement of said pairs of wheels for tilting said body to dump the same and for opening said closure gate.

9. A dump body vehicle including two pairs of wheels spaced longitudinally of the vehicle and movable relative to each other, a hydraulic ram interconnected between said pairs of wheels, said ram being actuated by relative movement of said pairs of wheels, a dump body tiltably carried by said pairs of wheels, a closure gate on said body, and means actuated by said hydraulic ram for tilting said body to dump the same and for simultaneously opening said closure gate.

10. A dump body vehicle, comprising two pairs of wheels spaced longitudinally of the vehicle and movable relatively to each other, a hydraulic ram interconnected between said pairs of wheels, said ram being actuated by relative movement of said pairs of wheels, a dump body tiltably carried by said pairs of wheels, a hydraulic ram interconnecting said body and one of said pairs of wheels for tilting said body to dump the same, a closure gate pivoted on said body, a hydraulic ram interconnecting said gate and body for actuating said gate to open and closed positions, and connections between said rams, whereby said body tilting and gate actuating rams are actuated when said first mentioned ram is actuated.

11. In a hydraulically operated dump body vehicle, two pairs of ground wheels, a hydraulic ram connecting said pairs of wheels, whereby movement of one pair of wheels toward or away from the other pair of wheels displaces fluid in said ram, a body pivotally supported by said wheels, a hydraulic ram connected to said body in spaced relation to its pivotal support for tilting said body, a closure gate pivoted on said body, a hydraulic ram interconnecting said gate and body for moving said gate on its pivotal support, and conduits connecting said rams whereby fluid displaced from said wheel connecting ram will actuate said body lifting ram to tilt said body on its pivotal support for dumping the same and for simultaneously actuating said gate ram to open said gate.

12. In a hydraulically operated dump body vehicle, two pairs of ground wheels, a hydraulic ram connecting said pairs of wheels and serving as a connecting frame therebetween, whereby movement of one pair of wheels toward or away from the other pair of wheels displaces fluid in said ram, a dump body pivotally supported by said wheels, a hydraulic ram connected to said body in spaced relation to its pivotal support for tilting said body to dump the same, a closure gate movably mounted on said body, a hydraulic ram interconnecting said gate and body for moving said gate, and conduits connecting said rams, whereby fluid displaced from said wheel connecting ram will actuate said body lifting ram to tilt said body on its pivotal support for dumping the same and for simultaneously actuating said gate ram to open said gate.

13. In a semi-trailer having a motor tractor, a pair of ground wheels on the semi-trailer and a pair of ground wheels on the tractor, a hydraulic ram connecting said pairs of wheels, whereby movement of one pair of wheels toward or away from the other pair of wheels displaces fluid in said ram, a dump body having one end supported on and pivoted to said semi-trailer wheels, and its other end adapted to be supported on the motor tractor, a hydraulic ram connected to said body in spaced relation to its pivotal support for tilting said body on its pivotal support, a closure gate movably mounted on said body, a hydraulic ram interconnecting said gate and body for moving said gate, and conduits interconnecting said rams whereby fluid displaced from said wheel connecting ram will actuate said body lifting ram to tilt said body on its pivotal support to dump the same and for simultaneously actuating said gate ram to open said gate.

14. A semi-trailer telescoping frame comprising a hydraulic ram interconnected between the semi-trailer wheels and a fifth wheel adapted to be supported on a tractor and a plurality of function performing hydraulic rams hydraulically connected to said first mentioned ram so as to be actuated by telescoping movement of said frame.

EDWARD R. BARRETT.